United States Patent
Auger et al.

(10) Patent No.: US 8,902,063 B2
(45) Date of Patent: Dec. 2, 2014

(54) SAFETY DETECTION SYSTEM WITH INTEGRATED DIAGNOSTIC FUNCTIONS

(71) Applicant: Schneider Electric Industries SAS, Rueil Malmaison (FR)

(72) Inventors: Marc Auger, Soyaux (FR); Mireille Roger, Ruelle sur Touvre (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 13/890,764

(22) Filed: May 9, 2013

(65) Prior Publication Data

US 2013/0314231 A1 Nov. 28, 2013

(30) Foreign Application Priority Data

May 25, 2012 (FR) ...................................... 12 54830

(51) Int. Cl.
| | | |
|---|---|---|
| *G08B 21/00* | (2006.01) | |
| *G08B 3/10* | (2006.01) | |
| *H01H 47/00* | (2006.01) | |
| *H02J 7/00* | (2006.01) | |
| *G05B 9/02* | (2006.01) | |
| *H02H 5/10* | (2006.01) | |
| *H02H 11/00* | (2006.01) | |
| *F16P 3/08* | (2006.01) | |

(52) U.S. Cl.
CPC .............. *G08B 3/10* (2013.01); *H01H 47/005* (2013.01); *H02J 7/0021* (2013.01); *G05B 9/02* (2013.01); *H02H 5/10* (2013.01); *H02H 11/00* (2013.01); *F16P 3/08* (2013.01)
USPC ........................................... 340/540; 702/58

(58) Field of Classification Search
USPC ............................ 340/540; 702/58; 327/158

IPC ........... H02J 7/0021; G08B 9/02; H01H 47/005
See application file for complete search history.

(56) References Cited

U.S. PATENT DOCUMENTS

| | | | |
|---|---|---|---|
| 4,290,055 A | 9/1981 | Furney et al. | |
| 4,568,919 A | 2/1986 | Muggli et al. | |
| 5,434,457 A | 7/1995 | Josephs et al. | |
| 7,940,098 B1 * | 5/2011 | Kwasniewski et al. | ....... 327/158 |

FOREIGN PATENT DOCUMENTS

| | | |
|---|---|---|
| DE | 197 15 013 A1 | 10/1998 |
| GB | 2 321 124 A | 7/1998 |

OTHER PUBLICATIONS

U.S. Appl. No. 13/865,779, filed Apr. 18, 2013, Auger.
U.S. Appl. No. 13/890,794, filed May 9, 2013, Auger, et al.
French Preliminary Search Report issued Jan. 23, 2013, in French Application No. 12 54830 filed May 25, 2012 (with English Translation of Categories of Cited Documents).

* cited by examiner

*Primary Examiner* — Shirley Lu
(74) *Attorney, Agent, or Firm* — Oblon, Spivak, McClelland, Maier & Neustadt, L.L.P.

(57) ABSTRACT

The invention relates to a safety detection system comprising a detection chain formed by a number of interconnected safety detectors (D1, ... D5). The detectors (D1, ... D5) in the chain are also interconnected in order to form a diagnostic line in parallel with the safety chain. The first detector thus comprises means for generating diagnostic information comprising its surveillance state, and means for sending this diagnostic information, on the diagnostic line, to the second detector in the chain, which in turn enriches the diagnostic information. At the end of the chain, the last detector is connected to a diagnostic module (MD) intended to receive the diagnostic information, to interpret it, and to control the start-up of the application to be secured.

8 Claims, 4 Drawing Sheets

SAFETY DETECTION SYSTEM WITH INTEGRATED DIAGNOSTIC FUNCTIONS

TECHNICAL FIELD OF THE INVENTION

The present invention relates to a safety detection system with an enhanced integrated diagnostic function.

To secure access to a machine located in a room, it is known to fit a safety detection system that makes it possible to prevent the machine from being started-up when the means of access to the room is open. As a given room may have a number of access means, at least one detector is provided to secure each access means. In this situation, the detectors are wired in series so that the output terminals of a first detector are connected to the input terminals of a second detector, and so on. Thus, it is only possible start-up the machine when all the safety outputs of the detectors are active, i.e. when all the means of access to the room are closed. In state-of-the-art safety detection systems, an additional safety module is connected to the output terminals of the last detector in the chain and to means for starting-up the machine. Two control relays of the machine and a return loop comprising an on button are connected to the additional safety module.

A detection chain is for example disclosed in document U.S. Pat. No. 4,290,055.

However, two types of event can prevent the machine from being started-up: opening of an access means and a break in the wiring of the chain. The opening of an access means is associated with normal operation of the system. A break in the wiring is associated with defective or fraudulent operation.

In a detection chain, each detector is generally equipped with an indicator light that indicates the open or closed state of the access means monitored. In an installation with a number of accesses, if an access means remains open, the operator must then check each detector in order to find out which is preventing the machine from being started-up.

To overcome this drawback, methods have been proposed for centrally monitoring the state of the detectors in the detection chain from a control station.

One of these methods consists in adding a direct connection between each detector in the detection chain and the programmable logic controller with a view to centrally monitoring the state of all the detectors and to identify the detector indicating an open access means. However, this system requires a large amount of wiring and a controller with many inputs.

Another method consists in networking the detectors and the safety programmable logic controller, for example by means of a bus. The safety programmable logic controller is responsible for analysing the surveillance state of each detector, in parallel with the detection chain. This method is expensive and proves to be difficult to implement.

Existing methods allowing open access means to be identified are satisfactory for diagnosis during normal operation of the detection system, such as is the case in prior-art document U.S. Pat. No. 4,290,055. However none of them allows a break in the wiring to be differentiated from normal operation and a diagnosis to be carried out in the case of defective or fraudulent operation.

PRIOR ART

The aim of the invention is to provide a safety detection system employing safety detectors connected in series, and with which it is possible:

to centrally monitor the surveillance states of the detectors in the detection chain;
to determine the surveillance state, open or closed, of each detector without using a large amount of wiring;
to detect a break in the detection chain;
to distinguish various types of fault;
to localise a fault in the detection chain;
to analyse and interpret the diagnosis consistently with the response time of the detection chain; and
control starting-up of the machine.

SUMMARY OF THE INVENTION

This aim is achieved by a safety detection system comprising:

at least one first detector and one second detector, each detector comprising two input terminals connected to its safety logic inputs, two output terminals connected to its safety logic outputs and two supply terminals connected to two electrical supply lines, the two output terminals of the first detector being connected to the two input terminals of the second detector and the two output terminals of the second detector being connected directly, or indirectly via a safety module, to members for controlling the application to be secured, so as to form a detection chain;

the safety logic outputs of each detector being activated depending on a surveillance state of said detector;

the first detector comprising a diagnostic output interface, and the second detector comprising a diagnostic input interface, connected only to the diagnostic output interface of the first detector, and a diagnostic output interface, so as to form a diagnostic line;

the first detector comprising means for generating diagnostic information comprising its surveillance state, and means for sending this diagnostic information on the diagnostic line to the second detector;

the second detector being designed to enrich the diagnostic information received by inserting therein its surveillance state; and the system comprising a diagnostic module connected to the diagnostic output interface of the second detector and intended to receive the diagnostic information, to interpret it, and to control the start-up of the application.

According to one feature, the diagnostic information takes the form of a diagnostic frame comprising a start bit, one or more bits each reflecting the surveillance state of each detector in the detection chain, and a stop bit.

According to another feature, the detectors in the chain are designed to implement an initialisation phase making it possible to determine which detector is the first detector in the detection chain, this detector being intended to generate the diagnostic information.

According to another feature, each detector comprises means for memorising its position relative to the first detector in the chain.

According to another feature, the first detector in the detection chain is designed to emit diagnostic frames separated from each other by a set regular time interval.

According to another feature, each detector is designed to launch what is called a timeout procedure, in which it generates what is called a timeout frame, when it does not receive the diagnostic frame in a set time interval.

According to another feature, a detector generating a timeout frame is designed to deactivate its safety logic outputs, preventing starting-up of the application, until it is restarted.

According to another feature, the time interval that triggers the timeout procedure is different for each detector in the chain.

BRIEF DESCRIPTION OF THE FIGURES

Other features and advantages will become apparent from the following detailed description given with regard to the appended drawings in which.

DETAILED DESCRIPTION OF AT LEAST ONE EMBODIMENT

In the rest of the description the expression "surveillance state" will be used to define the state 1 or the state 0 of the detector, i.e. for example the closed state (1) or the open state (0) of an access means if the detector is intended to monitor an access means.

Figure 1:
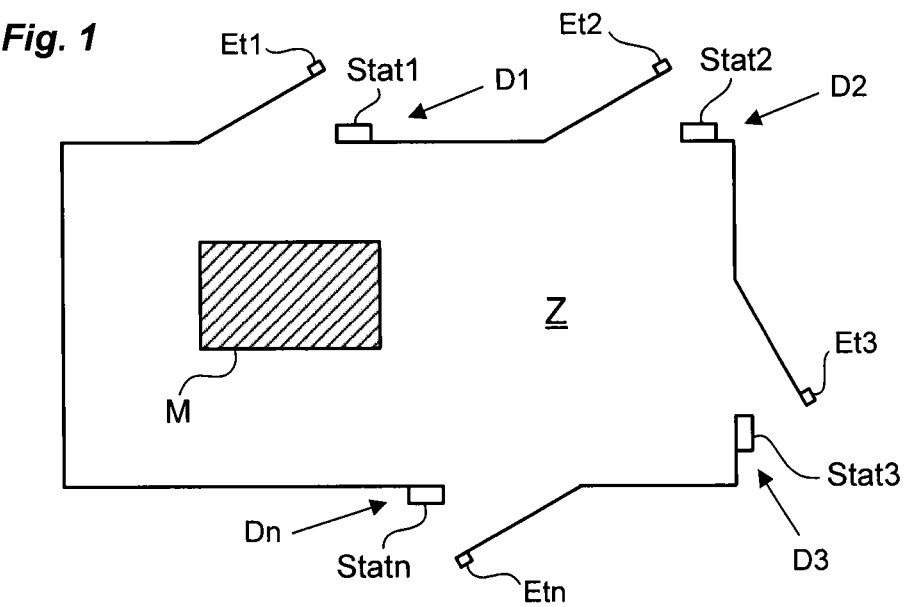
FIG. 1 illustrates the context of use of a safety detection system.

The invention relates to a safety detection system. Such a safety detection system is for example used to secure the starting-up of an application, for example a machine, located in a room Z. FIG. 1 illustrates this example. The safety detection system comprises a number of detectors D1, D2, D3, ... Dn connected in series, each detector being dedicated to the surveillance of a means of access to the room Z. It is possible to start-up the machine M only if all the safety outputs of the detectors are active, i.e. when all the means of access to the room are closed.

The detectors for example employ radio-identification technology (RFID below). Of course, technologies other than RFID could be used, such as, for example, detection technology employing the Hall effect, optical effects, or magnetic contacts. The rest of the description relates to detectors employing RFID.

In the context illustrated by FIG. 1, an electronic RFID tag Et1, Et2, Et3 is for example fastened to the access means, whereas a read/write unit Stat1, Stat2, Stat3 is fastened to the frame of the access means. When the electronic RFID tag Et1, Et2, Et3 is located in the field of the unit, it means that the access means is closed and therefore that the safety outputs of the detector are active.

Figure 3:
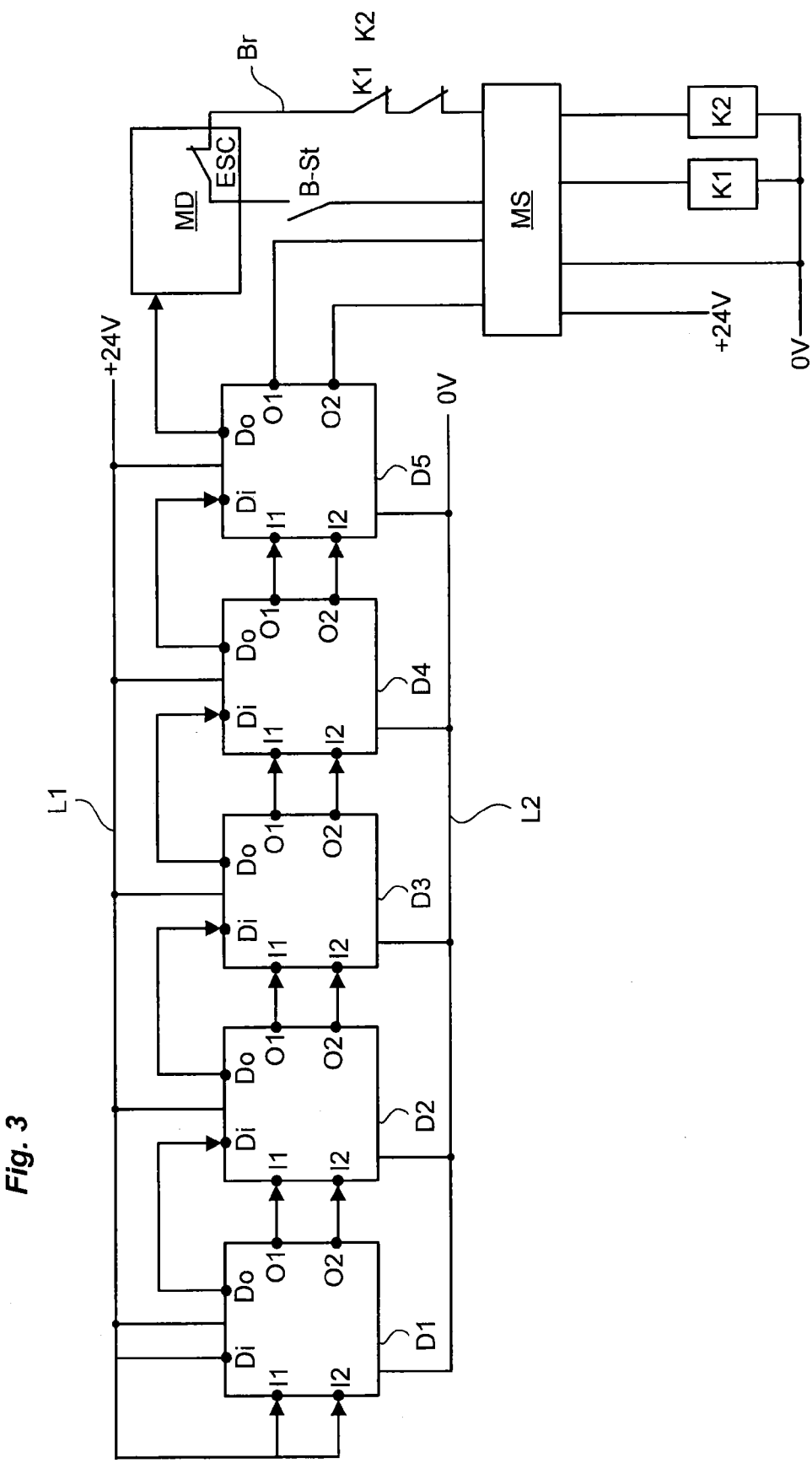
FIG. 3 shows a safety detection system according to the invention.

The rest of the description relates to a detection chain that comprises a number n of detectors, n being greater than or equal to two. Detector number n is located at the end of the detection chain. In FIG. 3, the safety detection system of the invention comprises five detectors D1, D2, D3, D4, D5.

Figure 2:
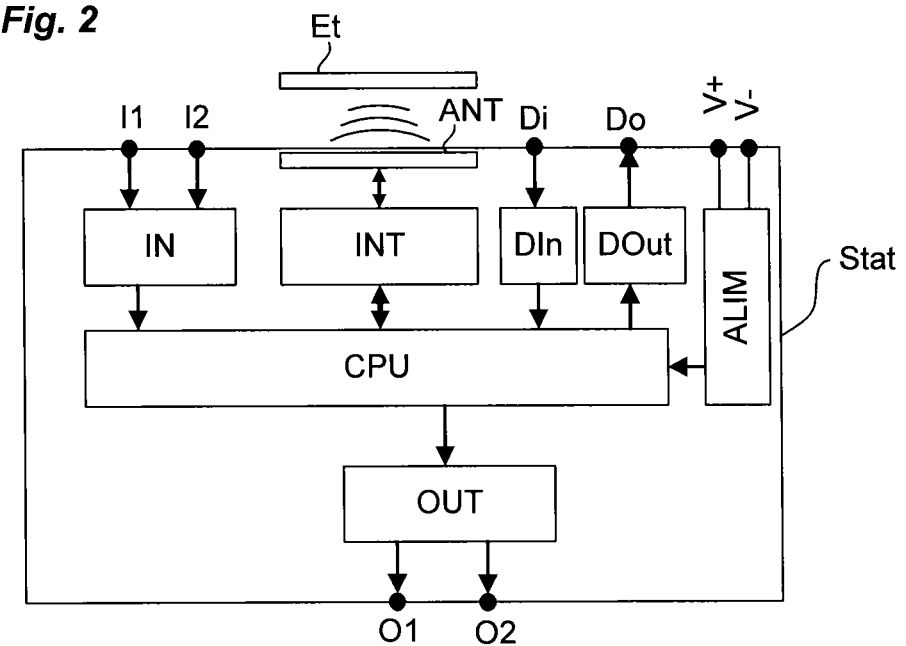
FIG. 2 shows functional architecture of the detector employed in the detection system of the invention.

As shown in FIG. 2, each read/write unit Stat of a detector comprises two safety input terminals I1, I2 connected to its safety logic inputs IN (sa inputs below), two safety output terminals O1, O2 connected to its safety logic outputs OUT (safety outputs below), and two supply terminals (V−, V+) connected to means ALIM for managing the supply of power. The unit Stat also comprises processing means CPU receiving the state of the safety inputs and defining the state of the safety outputs. If the detector employs RFID technology, it also comprises an RFID interface INT and an antenna ANT allowing it to communicate with an electronic RFID tag Et.

According to the invention, each detector also comprises a diagnostic input terminal Di connected to a diagnostic input interface Din and a diagnostic output terminal Do connected to a diagnostic output interface DOut. The processing means CPU of a detector are able to generate diagnostic information to be sent to its diagnostic output interface DOut.

As shown in FIG. 3, in the safety detection system of the invention the safety output terminals O1, O2 of detector number 1 are connected to the safety input terminals I1, I2 of detector number 2, the safety output terminals O1, O2 of detector number 2 are connected to the safety input terminals I1, I2 of detector number 3, and so on. The safety output terminals O1, O2 of detector number n-1 are thus connected to the safety input terminals I1, I2 of detector number n.

An additional safety module MS is for example connected to the end of the chain. This additional safety module MS manages the start-up mode of the machine M and monitors the return loop Br, i.e. the state of the control relays K1, K2 of the machine. As a variant embodiment, according to the invention, the output terminals O1, O2 of detector number n are connected directly to the two control relays K1, K2 of the machine M. The return loop Br, allowing the state of the two relays K1, K2 to be monitored, is connected between a start-up input terminal and a test output terminal of detector number n (variant not shown). An on button B-St of the machine is placed in this return loop Br.

The machine M is started-up by pressing the on button B-St and is possible only if the safety outputs of detector number n are active and if the return loop Br is closed.

The two supply terminals (V−, V+) of each detector in the chain are connected to two supply lines extending over the entire length of the chain and connected to a power source. The first supply line L1 is at an electric potential of zero and the second supply line L2 is at a positive electric potential, for example set to +24 volts. The two safety input terminals of the first detector in the chain are connected to the second supply line L2 in order to automatically activate the two safety inputs IN of the first detector in the chain.

Wiring between two detectors in the chain is achieved using for example two T- or Y-shaped interconnection members. One interconnection member is associated with each detector in the chain. Thus, the detection system also comprises n identical interconnection members. Of course, it would be possible to omit the interconnection members by integrating, in each detector, the wiring configuration achieved with each of the interconnection members.

The interconnection members are designed to ensure the continuity of the supply lines L1, L2 and to connect the output terminals O1, O2 of a detector to the input terminals I1, I2 of the following detector.

In normal operation, if all the access means are closed, the safety outputs OUT of detectors numbers 1 to n-1 are active and the safety inputs IN of detector number n, located at the end of the chain, are then active. The safety outputs OUT of detector number n will be active if the RFID tag is within range of the reader. The return loop Br must be closed, i.e. the two surveillance relays K1, K2 must be closed, and the on button B-St must be pressed if the safety module MS, and therefore the machine, is to be started-up. If an access means is open, the safety outputs OUT of the detector of this access means are inactive. Since the safety outputs OUT and the safety inputs IN of the detectors are connected in series, the safety outputs OUT and the safety inputs IN of all the detectors located after said detector will then all be inactive.

According to the invention, in addition to forming a safety detection chain, the detectors in the chain form a diagnostic line. The diagnostic output terminal Do of detector number 1 is thus connected only to the diagnostic input terminal Di of detector number 2 and the diagnostic output terminal Do of detector number 2 is connected only to the diagnostic input terminal Di of detector number 3, and so on up to detector number n, the diagnostic output terminal Do of which is connected to a diagnostic module MD forming part of the safety detection system of the invention. The interconnection members described above are for example designed in order to provide diagnostic wiring between the detectors in the chain.

The diagnostic line thus formed allows diagnostic information to be transferred. Each detector in the chain enriches the diagnostic information by indicating its surveillance state, i.e. the state of the access means, open or closed, that it is monitoring, and sends the enriched information to the following detector in the chain. The diagnostic line extending between each detector for example takes the form of a single wire.

The diagnostic input terminal Di of the first detector D1 in the chain is connected to the second supply line L2 in order to automatically activate the diagnostic input interface Din of the first detector D1.

The diagnostic module MD, located at the end of the chain, collects the diagnostic information and determines, from the latter, the surveillance state of each detector in the chain. The diagnostic module MD and the safety module MS may take the form of two separate units, or be grouped together in the same piece of hardware.

Generation of the diagnostic information is initiated by the first detector D1 in the chain. The first detector in the chain is for example identified when the system is first started up, during an initialisation phase. The first time the system is started up, each detector sends to its diagnostic output interface DOut a preset frame, for example 00H, unrelated to its surveillance state. Thus, the detector that receives no signal at its diagnostic input interface Din identifies itself as the first detector in the chain.

Once the initialisation phase has terminated, the first detector D1 in the chain generates diagnostic information. This diagnostic information is, in this example, a diagnostic frame and contains:
  a start bit St;
  a bit indicating the surveillance state of the detector (i.e. access means open=0 and access means closed=1);
  a separation bit Sn (set to 0);
  other bits set to 1; and
  a stop bit Sp located at the end of the frame.

The following detectors in the chain are waiting for the diagnostic frame to arrive at their diagnostic input interface Din. When the frame is received by a detector, the latter shifts the data indicating the surveillance state of the preceding detectors then adds, between these data and the start bit St, a bit indicating its surveillance state. The detector then sends the thus completed frame to its diagnostic output interface DOut.

The separation bit Sn is the last bit set to 0 in the frame. Each detector is thus able to determine how many detectors are located before it in the chain, quite simply by counting the number of bits between the start bit St and the separation bit Sn. Each detector is able to memorise its position relative to the first detector in the safety chain. Each detector is likewise able to determine and memorise the surveillance state of the detectors located before it in the chain.

The last bit in the diagnostic frame is always set to 1 and cannot be employed to transmit the state of an access means. By virtue of this bit, the diagnostic module MD can differentiate an initialisation frame from a diagnostic frame, even if all the access means are open.

Diagnostic frames are for example sent at preset time intervals Td, the emission frequency being set by the first detector D1 in the chain.

Figure 4:
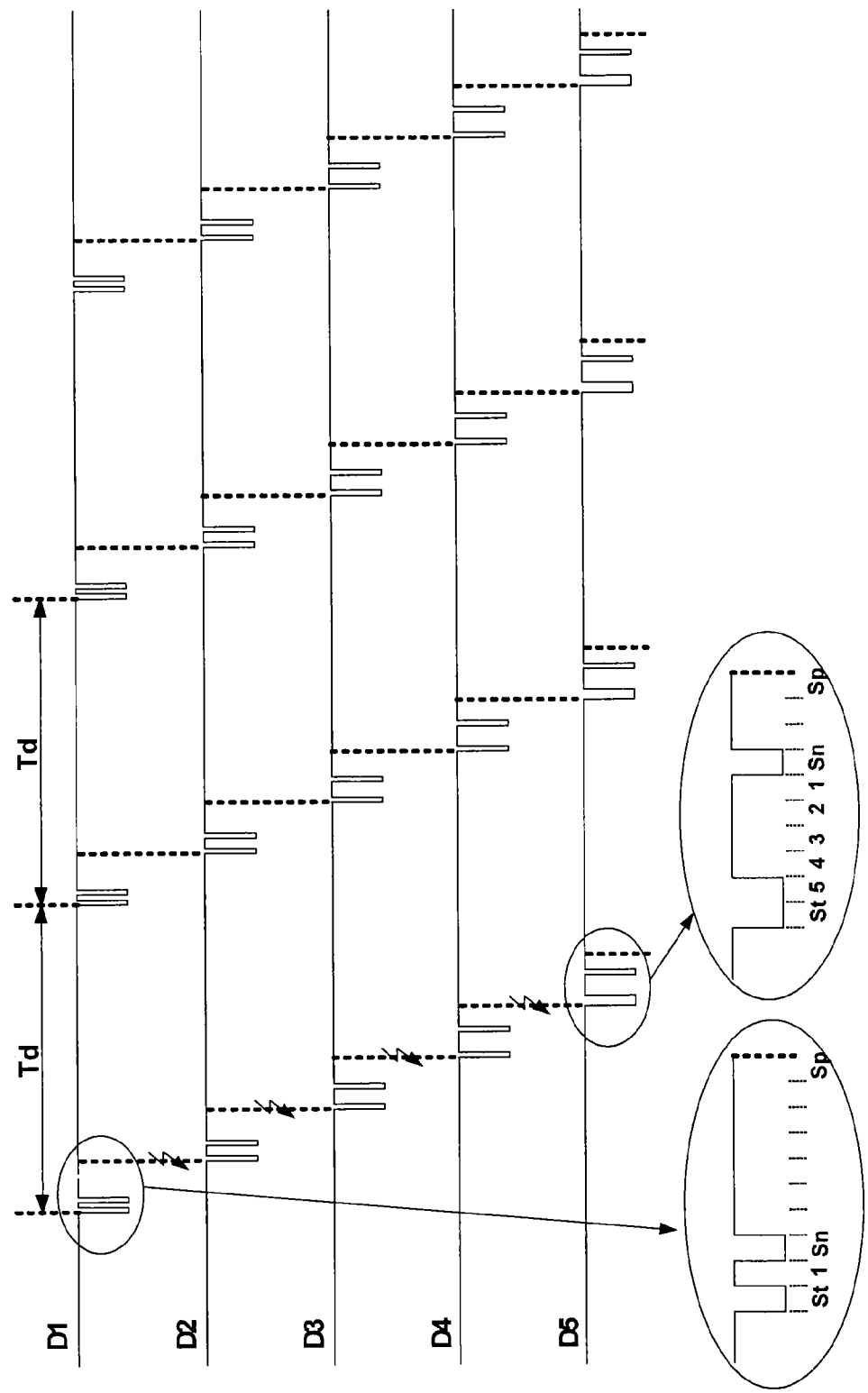
FIG. 4 shows a first timing diagram illustrating the principle of diagnosis of the detection system of the invention.

FIG. 4 illustrates the passage of a diagnostic frame through the detection system containing five detectors connected in series. This timing diagram illustrates a situation in which the access means monitored by detectors numbers 1 to 4 are closed and the access means monitored by detector number 5 is open.

In this timing diagram:
  The first detector D1 sends the first diagnostic frame; this frame comprises a start bit St set to 0, a bit representing its surveillance state, set to 1 because the monitored access means is closed, a separation bit Sn always set to 0, and other bits set to 1 up to the stop bit Sp. This diagnostic frame is sent to the diagnostic input interface Din of the second detector D2.
  The second detector D2 receives the diagnostic frame and adds between the start bit St and the bit representing the surveillance state of the first detector a bit corresponding to its own surveillance state. This bit is set to 1 because the access means monitored by the second detector D2 is closed. The second detector D2 sends the diagnostic frame, thus enriched, to the third detector.
  The third detector D3 does the same taking account of its surveillance state. The added bit is therefore set to 1 because the access means monitored by the third detector D3 is closed. The third detector D3 sends the completed diagnostic frame to the fourth detector D4.
  The fourth detector D4 enriches the diagnostic frame in the same way as above and sends it to the fifth detector D5 in the chain.
  The fifth detector D5 completes the frame by adding, between the start bit St and the bit representing the surveillance state of the fourth detector D4, a bit set to 0 because the access means monitored by the fifth detector D5 is open.

After a preset time interval Td, the first detector D1 generates a new diagnostic frame.

Of course, the length of the diagnostic frame depends on the number of detectors present in the chain. It will be a byte if the chain comprises two to six detectors, two bytes if the chain comprises between seven and fourteen detectors, and three bytes if the chain comprises between fifteen and twenty-two detectors. In any case, the diagnostic frame remains small in length, thereby allowing its contents to be rapidly analysed, consistently with the response time of the safety chain.

According to the invention, if a detector receives no diagnostic data in the preset time window, a procedure, called a timeout procedure, is triggered by said detector. The timeout procedure results from a malfunction in the chain, generally a break in the wiring or a hardware fault. In this situation, an inactive state appears at the inputs I1, I2 of the detector that triggers the timeout procedure. The safety outputs OUT of said detector and those of all the detectors placed after it in the safety chain go to the inactive state. Start-up of the machine M is prevented until the next restart.

When a detector implements a timeout procedure, i.e. when it does not receive a diagnostic frame in a preset time window, it generates a timeout frame and sends it to the following detector in the detection chain. The detector that initiates the timeout frame, i.e. the first detector in the chain that receives nothing, sets the bits representing the surveillance states of the detectors located upstream of it to a value of 0. A timeout frame is then generated at set time intervals Tt, the emission frequency of the timeout frame being fixed by the detector that initiates the timeout procedure.

Figure 5:
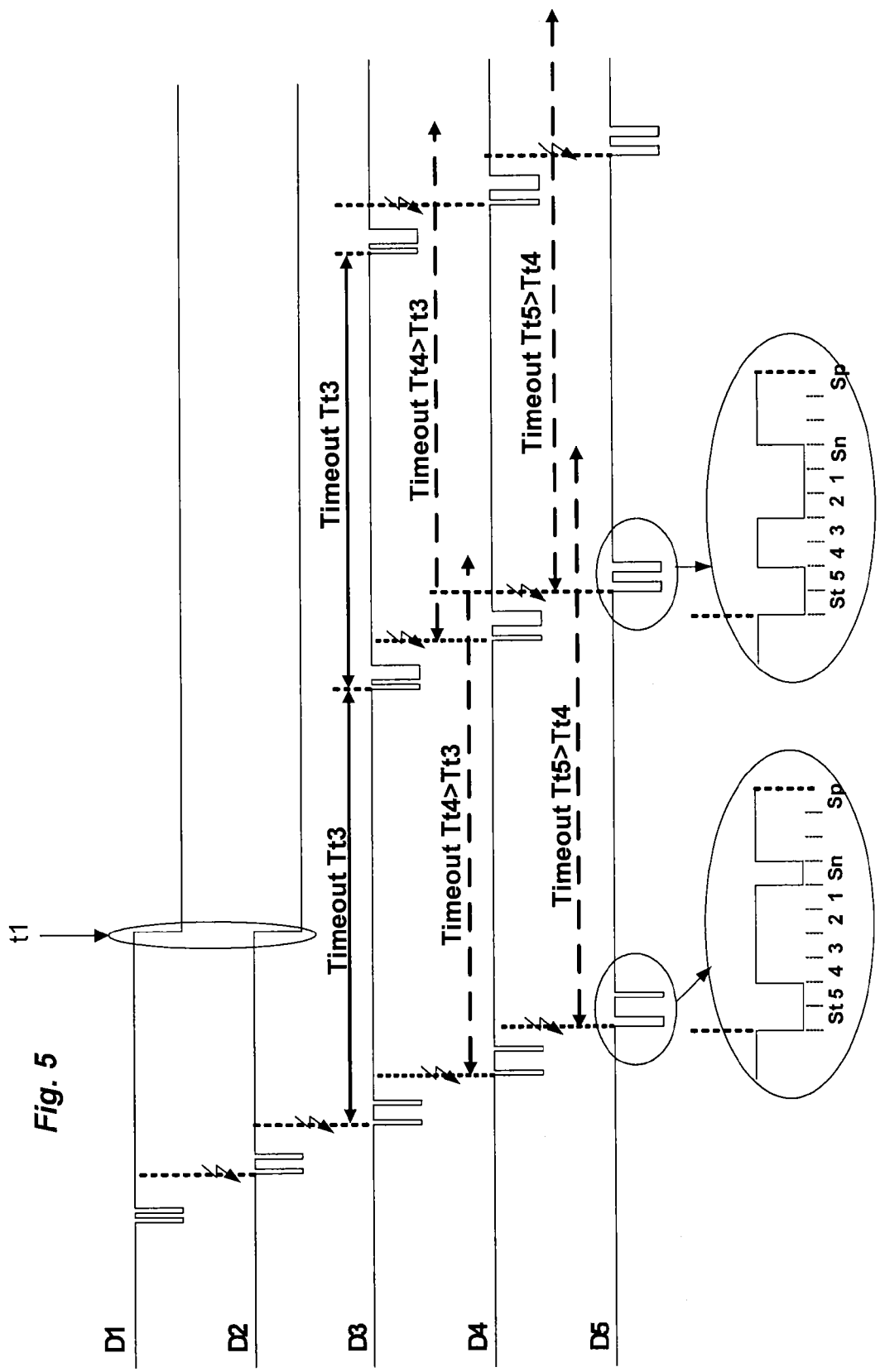
FIG. 5 shows a second timing diagram illustrating the principle of diagnosis of the detection system of the invention.

FIG. 5 illustrates the implementation of a timeout procedure. The timing diagram in FIG. 5 illustrates a situation in which at a given instant t1 the diagnostic line connecting the second detector D2 to the third detector D3 is cut. In this timing diagram:

The first diagnostic frame is sent by the first detector D1 and passes normally as far as the fifth detector D5.

At an instant t1, the line connecting the second detector D2 to the third detector D3 is cut, preventing any new diagnostic frames from reaching the third detector D3.

Since the third detector D3 receives nothing in the provided time interval Tt3, said detector generates a timeout frame. In this timeout frame the third detector sets the bits representing the surveillance states of the first and second detectors D1, D2, located upstream, to 0.

The fourth detector D4 and the fifth detector D5 receive the timeout frame and enrich it as above, each of them adding a bit corresponding to their surveillance state.

In order for each detector to have time to read a timeout frame before timing out itself, all the detectors do not have the same timeout interval Tt. Thus, in FIG. 5, Tt4>Tt3 and Tt5>Tt4. The timeout value of a detector x in the chain could, for example, be set to a value Ttx that is a function of the number of detectors present before it in the chain. Ttx=Tt1+(x−1)Δt where:

Tt1 is the initial timeout value defined based on the emission period Td of a diagnostic frame, set by the first detector;

Δt is the additional time to be added for each detector; and x is the position of the detector in the chain.

Each time a detector in the chain times out or receives timeout frames in the timeout period, it will prevent the machine M from being started-up again, until it is restarted, by keeping its safety outputs OUT deactivated. On receiving a timeout frame, the diagnostic module MD opens a contact ESC located in the return loop Br in order to prevent the machine M from being started-up again without a prior restart.

Other events may also lead to start-up of the machine M being prevented until the next restart, for example:

Diagnostic input permanently 0. The end of line plug or a cable located upstream of the first detector D1 is disconnected.

Emission of a diagnostic frame set to 00H when the initialisation phase has already been carried out. The preceding detector in the chain has been disconnected then reconnected.

Reception of an initialisation frame other than 00H. The detector that received the diagnostic frame has certainly been disconnected then reconnected.

Incorrect number of bits in the diagnostic frame. One or more detectors have, for example, been added to the detection chain.

As described above, most miswiring is seen by the detectors themselves, which, by keeping their safety outputs OUT inactive, prevent the machine M from being started-up.

The diagnostic module MD manages the miswiring that remains possible if the final cable located between the last detector and the control station is not secured. If said final cable is disconnected, the diagnostic module MD prevents the machine from being started-up before a restart by opening the contact ESC.

The invention claimed is:

1. Safety detection system comprising:
at least one first detector and one second detector, each detector comprising two input terminals connected to its safety logic inputs, two output terminals connected to its safety logic outputs and two supply terminals connected to two electrical supply lines, the two output terminals of the first detector being connected to the two input terminals of the second detector and the two output terminals of the second detector being connected directly, or indirectly via a safety module, to members for controlling the application to be secured, so as to form a detection chain;
the safety logic outputs of each detector being activated depending on a surveillance state of said detector, characterised in that:
the first detector comprises a diagnostic output interface, and the second detector comprises a diagnostic input interface, connected only to the diagnostic output interface of the first detector, and a diagnostic output interface, so as to form a diagnostic line;
the first detector comprises means for generating diagnostic information comprising its surveillance state, and means for sending this diagnostic information on the diagnostic line to the second detector;
the second detector is designed to enrich the diagnostic information received by inserting therein its surveillance state; and
the system comprises a diagnostic module connected to the diagnostic output interface of the second detector and intended to receive the diagnostic information, to interpret it, and to control the start-up of the application.

2. System according to claim 1, characterised in that the diagnostic information takes the form of a diagnostic frame comprising a start bit, one or more bits each reflecting the surveillance state of each detector in the detection chain, and a stop bit.

3. System according to claim 1, characterised in that the detectors in the chain are designed to implement an initialisation phase making it possible to determine which detector is the first detector in the detection chain, this detector being intended to generate the diagnostic information.

4. System according to claim 3, characterised in that each detector comprises means for memorising its position relative to the first detector in the chain.

5. System according to claim 1, characterised in that the first detector in the detection chain is designed to emit diagnostic frames separated from each other by a set regular time interval.

6. System according to claim 2, characterised in that each detector is designed to launch a timeout procedure, in which it generates a timeout frame, when it does not receive the diagnostic frame in a set time interval.

7. System according to claim 6, characterised in that a detector generating a timeout frame is designed to deactivate its safety logic outputs, preventing start-up of the application, until it is restarted.

8. System according to claim 6, characterised in that the time interval that triggers the timeout procedure is different for each detector in the chain.

* * * * *